(12) United States Patent
Horiguchi

(10) Patent No.: US 10,317,873 B2
(45) Date of Patent: Jun. 11, 2019

(54) NUMERICAL CONTROLLER AND SYNCHRONOUS FOLLOW-UP CONTROL METHOD

(71) Applicant: FANUC CORPORATION, Yamanashi (JP)

(72) Inventor: Kouichirou Horiguchi, Yamanashi-ken (JP)

(73) Assignee: FANUC CORPORATION, Yamanashi (JP)

(\*) Notice: Subject to any disclaimer, the term of this patent is extended or adjusted under 35 U.S.C. 154(b) by 91 days.

(21) Appl. No.: 15/496,050

(22) Filed: Apr. 25, 2017

(65) Prior Publication Data

US 2017/0315534 A1 Nov. 2, 2017

(30) Foreign Application Priority Data

Apr. 28, 2016 (JP) .................................. 2016-090901

(51) Int. Cl.
*G05B 19/18* (2006.01)
*G05B 19/402* (2006.01)
(Continued)

(52) U.S. Cl.
CPC ....... *G05B 19/402* (2013.01); *G05B 19/4103* (2013.01); *G05B 19/406* (2013.01);
(Continued)

(58) Field of Classification Search
CPC .................................................. G05B 19/4061
(Continued)

(56) References Cited

U.S. PATENT DOCUMENTS 3,781,629 A \* 12/1973 Hashimoto ............ G05B 19/40
318/632
6,539,489 B1 \* 3/2003 Reinert ..................... G06F 1/14
713/400
(Continued)

FOREIGN PATENT DOCUMENTS

JP 4238504 A 8/1992
JP 200127904 A 1/2001
(Continued)

OTHER PUBLICATIONS

English Abstract and Machine Translation for Japanese Publication No. 2003-044144 A, published Feb. 14, 2003, 11 pgs.
(Continued)

*Primary Examiner* — Suresh Suryawanshi
(74) *Attorney, Agent, or Firm* — Fredrikson & Byron, P.A.

(57) ABSTRACT

A numerical controller contains a position table where a positional relationship is defined between a position of a master axis and positions of a plurality of slave axes, a slave axis synchronous control unit that drives and controls the plurality of slave axes in accordance with the position table so that the slave axes are synchronized with the master axis, a parent determining unit that determines one slave axis, which is stopped due to a failure, to be a parent of the master axis, and a master axis control unit that drives and controls the master axis based on a command position, and if a slave axis serving as the parent of the master axis is determined by the parent determining unit, drives and controls the master axis in accordance with the position table, so that the master axis is synchronized with the slave axis determined to be the parent.

15 Claims, 5 Drawing Sheets

(51) Int. Cl.
 *G05B 19/4103* (2006.01)
 *G05B 19/406* (2006.01)
(52) U.S. Cl.
 CPC .............. *G05B 2219/42186* (2013.01); *G05B 2219/42335* (2013.01)
(58) Field of Classification Search
 USPC ........................................................ 700/61
 See application file for complete search history.

(56) References Cited

U.S. PATENT DOCUMENTS

| | | | | |
|---|---|---|---|---|
| 6,888,334 B2* | 5/2005 | Fujibayashi | ........... | G05B 19/19 318/41 |
| 6,897,626 B2* | 5/2005 | Fujibayashi | ....... | G05B 19/4103 318/567 |
| 7,030,586 B2* | 4/2006 | Cazzavillan | ......... | G05B 19/414 318/570 |
| 7,095,203 B2* | 8/2006 | Endo | .................... | G05B 19/182 318/568.2 |
| 7,759,895 B2* | 7/2010 | Hishikawa | ........... | G05B 19/195 318/568.22 |
| 8,692,488 B2* | 4/2014 | Takayama | ............ | G05B 19/416 318/49 |
| 9,753,447 B2* | 9/2017 | Sawaragi | .............. | G05B 19/056 |
| 2003/0191553 A1* | 10/2003 | Isohata | ............... | G05B 19/4142 700/170 |
| 2004/0059460 A1* | 3/2004 | Endo | .................... | G05B 19/414 700/188 |
| 2005/0024003 A1 | 2/2005 | Kochiya et al. | | |
| 2005/0248304 A1* | 11/2005 | Endou | .................. | G05B 19/186 318/575 |
| 2015/0362895 A1* | 12/2015 | Horiguchi | .............. | G05B 19/19 318/561 |

FOREIGN PATENT DOCUMENTS

| | | |
|---|---|---|
| JP | 200344144 A | 2/2003 |
| JP | 3720825 B2 | 11/2005 |

OTHER PUBLICATIONS

English Abstract and Machine Translation for Japanese Publication No. 2001-027904 A, published Jan. 30, 2001, 15 pgs.
English Abstract and Machine Translation for Japanese Publication No. 04-238504 A, published Aug. 26, 1992, 7 pgs.
English Abstract for Japanese Publication No. 3720825 B2, published Nov. 30, 2005, 2 pgs.

* cited by examiner

FIG. 2

| POINT | MASTER AXIS M | SLAVE AXIS S1 | SLAVE AXIS S2 | SLAVE AXIS S3 | LINE SEGMENT WAVEFORM BETWEEN POINTS |
|---|---|---|---|---|---|
| 1 | 0.000 | 0.000 | 0.000 | 0.000 | STRAIGHT LINE |
| 2 | 10.000 | 5.000 | 0.000 | 9.000 | MODIFIED SINE |
| 3 | 20.000 | 9.000 | 6.000 | 12.000 | MODIFIED SINE |
| 4 | 30.000 | 12.000 | 10.000 | 17.000 | |
| ... | ... | ... | ... | ... | |

24

NUMERICAL CONTROLLER AND SYNCHRONOUS FOLLOW-UP CONTROL METHOD

CROSS-REFERENCE TO RELATED APPLICATION

This application is based upon and claims the benefit of priority from Japanese Patent Application No. 2016-090901 filed on Apr. 28, 2016, the contents of which are incorporated herein by reference.

BACKGROUND OF THE INVENTION

Field of the Invention

The present invention relates to a numerical controller and a synchronous follow-up control method by which the positions of a slave axis are synchronized with and made to follow the positions of a master axis.

Description of the Related Art

In a press machine in which workpieces made of sheet metal or the like are subjected to machining by being fitted into a mold, a case is known in which a transfer device is used to convey the workpieces inward and outward with respect to the press machine. In a system constituted by such a press machine and a transfer device, slave axes made up of three XYZ axes defined in three dimensions of the transfer device are driven in synchronism with positions of the press machine that serves as a master axis.

In Japanese Patent No. 3720825, a numerical controller is disclosed that moves one or more slave axes in synchronism with a master axis. More specifically, one axis to which a movement command is imparted is defined as the master axis, whereas an axis other than the master axis is defined as a slave axis. A movement command, which is obtained by copying the aforementioned movement command, is applied to the slave axis.

SUMMARY OF THE INVENTION

If peripheral devices or workpieces remain in the path of the slave axis and become obstacles, the synchronous control between the slave axis and the master axis is stopped, and the slave axis (hereinafter referred to as a slave axis to be avoided) is immediately stopped or moved in a retracting direction in order to avoid colliding with the obstacle. In this case, since the slave axis to be avoided and axes other than the slave axis to be avoided are placed in an asynchronous state, situations may occur in which the master axis and the slave axis interfere with each other, or interfere with other devices.

Further, in the case that excitation of a servo motor that drives the slave axis fails due to a factor such as the failure of a servo amplifier or the like, the slave axis (hereinafter referred to as an uncontrollable slave axis) moves due to inertia and thereafter stops. In this case, when axes (the master axis or the slave axes) other than the uncontrollable slave axis continue to move, the uncontrollable slave axis interferes with movement of the axes other than the uncontrollable slave axis, and therefore, it also is necessary to turn off and stop excitation of axes other than the uncontrollable slave axis, or to decelerate and stop such axes without turning off excitation thereof.

In the case that excitation of all of the axes is shut off, since the respective axes move by inertia and thereafter stop, it is impossible for the synchronous control to be performed. Further, even in the case that axes other than the uncontrollable slave axis are stopped without turning off excitation thereof, the uncontrollable slave axis and the axes other than the uncontrollable slave axis are placed in an asynchronous state. When the master axis and the slave axis are placed in an asynchronous state, situations may occur in which the master axis and the slave axis interfere with each other, or interfere with other devices. Further, even with the invention described in the aforementioned Japanese Patent No. 3720825, such problems cannot be dealt with.

Thus, the present invention has the object of providing a numerical controller and a synchronous follow-up control method in which a synchronized state of all axes is maintained, even in the case that a slave axis is stopped due to a failure, or the slave axis is intentionally stopped or moved in order to avoid an obstacle.

A first aspect of the present invention is characterized by a numerical controller, including a position table in which a positional relationship is defined between a position of a master axis and positions of a slave axis, a slave axis synchronous control unit configured to drive and control the slave axis in accordance with the position table so that the position of the slave axis is synchronized with and follows the position of the master axis, a parent determining unit configured to determine the slave axis to be a parent of the master axis, and a master axis control unit configured to drive and control the master axis based on a command position, and in the event that the slave axis which serves as the parent of the master axis is determined by the parent determining unit, drive and control the master axis in accordance with the position table, so that the position of the master axis is synchronized with and follows the position of the slave axis determined to be the parent.

According to such a configuration, even if the slave axis is stopped or moved, in either case, the synchronous state between the master axis and the slave axis can be maintained. Consequently, interference between the master axis and the slave axis can be prevented.

In the numerical controller according to the first aspect of the present invention, in the case that the slave axis is stopped due to a failure, the parent determining unit may determine the stopped slave axis to be the parent of the master axis.

In accordance with this feature, even if the slave axis is stopped due to a failure, the synchronous state between the master axis and the slave axis can be maintained. Consequently, interference between the master axis and the slave axis can be prevented.

In the numerical controller according to the first aspect of the present invention, in the case that a plurality of the slave axes are synchronized with the master axis, and in the event that the slave axis that serves as the parent of the master axis is determined by the parent determining unit, the slave axis synchronous control unit drives and controls a slave axis other than the slave axis determined to be the parent, so that the position of the slave axis other than the slave axis determined to be the parent is synchronized with and follows the position of the master axis.

In accordance with this feature, even if one of the slave axes from among the plurality of slave axes is stopped or moved intentionally, or even in the case of stoppage due to a failure, the synchronous state of all of the axes (the master axis and the plurality of slave axes) can be maintained. Consequently, interference between the master axis and the plurality of slave axes, or interference with other members or devices can be prevented. For example, in the case that one member is driven by all of the slave axes, even if one slave axis stops due to a failure, the member can be operated with a correct movement path.

In the numerical controller according to the first aspect of the present invention, the slave axis synchronous control unit may acquire position information of the master axis, and using the position information of the master axis and the position table, and may drive and control the slave axis, so that the position of the slave axis is synchronized with and follows the position of the master axis. In accordance with this feature, the synchronous control of the slave axis in relation to the master axis can be performed appropriately, and interference between the master axis and the slave axis can be prevented.

In the numerical controller according to the first aspect of the present invention, the master axis control unit may acquire position information of the slave axis determined to be the parent, and using the acquired position information of the slave axis and the position table, and may drive and control the master axis, so that the position of the master axis is synchronized with and follows the position of the slave axis determined to be the parent. In accordance with this feature, the synchronous control of the master axis in relation to the slave axis determined to be the parent can be performed appropriately, and interference between the master axis and the slave axis can be prevented.

In the numerical controller according to the first aspect of the present invention, in the event that the slave axis that serves as the parent of the master axis is determined by the parent determining unit, and in the case that, in the position table, there are a plurality of synchronous positions of the master axis corresponding to the position of the slave axis determined to be the parent, the master axis control unit determines one of the synchronous positions closer to a current position of the master axis to be the position of the master axis. In accordance with this feature, the synchronous control of the master axis in relation to the slave axis determined to be the parent can be performed appropriately, and interference between the master axis and the slave axis can be prevented.

A second aspect of the present invention is characterized by a numerical controller, including a position table in which a positional relationship is defined in advance between a position of a master axis and positions of a plurality of slave axes, a slave axis synchronous control unit configured to drive and control the plurality of slave axes in accordance with the position table, so that the positions of the plurality of slave axes are synchronized with and follow the position of the master axis, a parent determining unit configured to determine one slave axis, from among the plurality of slave axes, to be a parent of the master axis, and a virtual axis position determining unit configured to determine a position of a virtual axis, in which the master axis is constructed virtually, in accordance with the position table, so that the virtual axis is synchronized with and follows the position of the slave axis determined to be the parent, wherein the slave axis synchronous control unit, in the event that the slave axis that serves as the parent of the master axis is determined by the parent determining unit, drives and controls a slave axis other than the slave axis determined to be the parent in accordance with the position table, so that the position of the slave axis other than the slave axis determined to be the parent is synchronized with and follows the position of the virtual axis. At this time, upon construction of the virtual axis, the position of the virtual axis is the position of the master axis at that point in time.

According to such a configuration, in the case that the master axis is driven and controlled by a different controller, and a slave axis is stopped or moved, in either case, the synchronous state of all of the slave axes can be maintained. Stated otherwise, in the case that the master axis is driven and controlled by the other controller, the slave axis to be stopped cannot be the parent of the master axis, and the synchronous state between all of the slave axes collapses. However, by constructing the virtual axis of the master axis, it is possible to maintain the synchronous state of all of the slave axes. As a result, in the case that one member is driven by all of the slave axes, even if one slave axis is stopped, the member can be operated with a correct movement path.

In the numerical controller according to the second aspect of the present invention, the parent determining unit may determine one of the slave axes which is stopped due to a failure to be the parent of the master axis.

In accordance with this feature, in the event that the master axis is driven and controlled by a different controller, and even in the case that one of the slave axes is stopped due to a failure, the synchronous state of all of the slave axes can be maintained.

In the numerical controller according to the second aspect of the present invention, in the event that the slave axis that serves as the parent of the master axis is determined by the parent determining unit, and in the case that, in the position table, there are a plurality of synchronous positions of the master axis corresponding to the position of the slave axis determined to be the parent, the virtual axis position determining unit may determine one of the synchronous positions closer to a current position of the virtual axis to be the position of the virtual axis. In accordance with this feature, the synchronous control of the positions of the virtual axis in relation to the slave axis determined to be the parent can be performed appropriately, and the synchronous state of all of the slave axes can be maintained.

A third aspect of the present invention is characterized by a synchronous follow-up control method in which a position of a slave axis is synchronized with and made to follow a position of a master axis, including a master axis driving and controlling step of driving and controlling the master axis based on a command position, a slave axis synchronous controlling step of driving and controlling the slave axis in accordance with a position table in which a positional relationship is defined in advance between the position of the master axis and the position of the slave axis, so that the position of the slave axis is synchronized with and follows the position of the master axis, a parent determining step of determining the slave axis to be a parent of the master axis, and a master axis synchronous controlling step of, in the event that the slave axis which serves as the parent of the master axis is determined by the parent determining step, driving and controlling the master axis in accordance with the position table, so that the position of the master axis is synchronized with and follows the position of the slave axis determined to be the parent.

According to such a configuration, even if the slave axis is stopped or moved, in either case, the synchronous state between the master axis and the slave axis can be maintained. Consequently, interference between the master axis and the slave axis can be prevented.

In the synchronous follow-up control method according to the third aspect of the present invention, in the parent determining step, in the case that the slave axis is stopped due to a failure, the stopped slave axis may be determined to be the parent of the master axis.

In accordance with this feature, even if the slave axis is stopped due to a failure, the synchronous state between the master axis and the slave axis can be maintained. Consequently, interference between the master axis and the slave axis can be prevented.

In the synchronous follow-up control method according to the third aspect of the present invention, in the slave axis synchronous controlling step, in the case that a plurality of the slave axes are synchronized with the master axis, and in the event that the slave axis that serves as the parent of the master axis is determined by the parent determining step, a slave axis other than the slave axis determined to be the parent is driven and controlled, so that the position of the slave axis other than the slave axis determined to be the parent is synchronized with and follows the position of the master axis.

In accordance with this feature, even if one of the slave axes from among the plurality of slave axes is stopped or moved intentionally, or even in the case of stoppage due to a failure, the synchronous state of all of the axes (the master axis and the plurality of slave axes) can be maintained. Consequently, interference between the master axis and the plurality of slave axes, or interference with other members or devices can be prevented. For example, in the case that one member is driven by all of the slave axes, even if one slave axis stops due to a failure, the member can be operated with a correct movement path.

In the synchronous follow-up control method according to the third aspect of the present invention, in the master axis synchronous controlling step, in the case that the slave axis that serves as the parent of the master axis is determined by the parent determining step, and in the event that, in the position table, there are a plurality of synchronous positions of the master axis corresponding to the position of the slave axis determined to be the parent, one of the synchronous positions closer to a current position of the master axis is determined to be the position of the master axis. In accordance with this feature, the synchronous control of the master axis in relation to the slave axis determined to be the parent can be performed appropriately, and interference between the master axis and the slave axis can be prevented.

A fourth aspect of the present invention is characterized by a synchronous follow-up control method in which positions of a plurality of slave axes are synchronized with and made to follow a position of a master axis, including a slave axis synchronous controlling step of driving and controlling the plurality of slave axes in accordance with a position table in which a positional relationship is defined in advance between the position of the master axis and the positions of the plurality of slave axes, so that the positions of the plurality of slave axes are synchronized with and follow the position of the master axis, a parent determining step of determining one slave axis, from among the plurality of slave axes, to be a parent of the master axis, and a virtual axis position determining step of determining a position of a virtual axis, in which the master axis is constructed virtually, in accordance with the position table, so that the virtual axis is synchronized with and follows the position of the slave axis determined to be the parent, wherein, in the slave axis synchronous controlling step, in the event that the slave axis that serves as the parent of the master axis is determined by the parent determining step, a slave axis other than the slave axis determined to be the parent is driven and controlled, so that the position of the slave axis other than the slave axis determined to be the parent is synchronized with and follows the position of the virtual axis. At this time, upon construction of the virtual axis, the position of the virtual axis is the position of the master axis at that point in time.

According to such a configuration, in the case that the master axis is driven and controlled by a different controller, and a slave axis is stopped or moved, in either case, the synchronous state of all of the slave axes can be maintained. Stated otherwise, in the case that the master axis is driven and controlled by the other controller, the slave axis to be stopped cannot be the parent of the master axis, and the synchronous state between all of the slave axes collapses. However, by constructing the virtual axis of the master axis, it is possible to maintain the synchronized state of all of the slave axes. As a result, in the case that one member is driven by all of the slave axes, even if one slave axis is stopped, the member can be operated with a correct movement path.

In the synchronous follow-up control method according to the fourth aspect of the present invention, in the parent determining step, one of the slave axes that is stopped due to a failure may be determined to be the parent of the master axis.

In accordance with this feature, in the event that the master axis is driven and controlled by a different controller, and even in the case that one of the slave axes is stopped due to a failure, the synchronous state of all of the slave axes can be maintained.

In the synchronous follow-up control method according to the fourth aspect of the present invention, in the virtual axis position determining step, in the case that the slave axis that serves as the parent of the master axis is determined by the parent determining step, and in the event that, in the position table, there are a plurality of synchronous positions of the master axis corresponding to the position of the slave axis determined to be the parent, one of the synchronous positions closer to a current position of the virtual axis may be determined to be the position of the virtual axis. In accordance with this feature, the synchronous control of the positions of the virtual axis in relation to the slave axis determined to be the parent can be performed appropriately, and the synchronous state of all of the slave axes can be maintained.

According to the present invention, even if one of the slave axes is stopped or moved intentionally, or even in the case of stoppage due to a failure, the synchronous state of all of the axes can be maintained.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 2 is a diagram showing an example of information that is stored in a position table shown in FIG. 1;

DESCRIPTION OF THE PREFERRED EMBODIMENTS

Preferred embodiments in relation to a numerical controller and a synchronous follow-up control method according to the present invention will be presented and described in detail below with reference to the accompanying drawings.

First Embodiment

Figure 1:
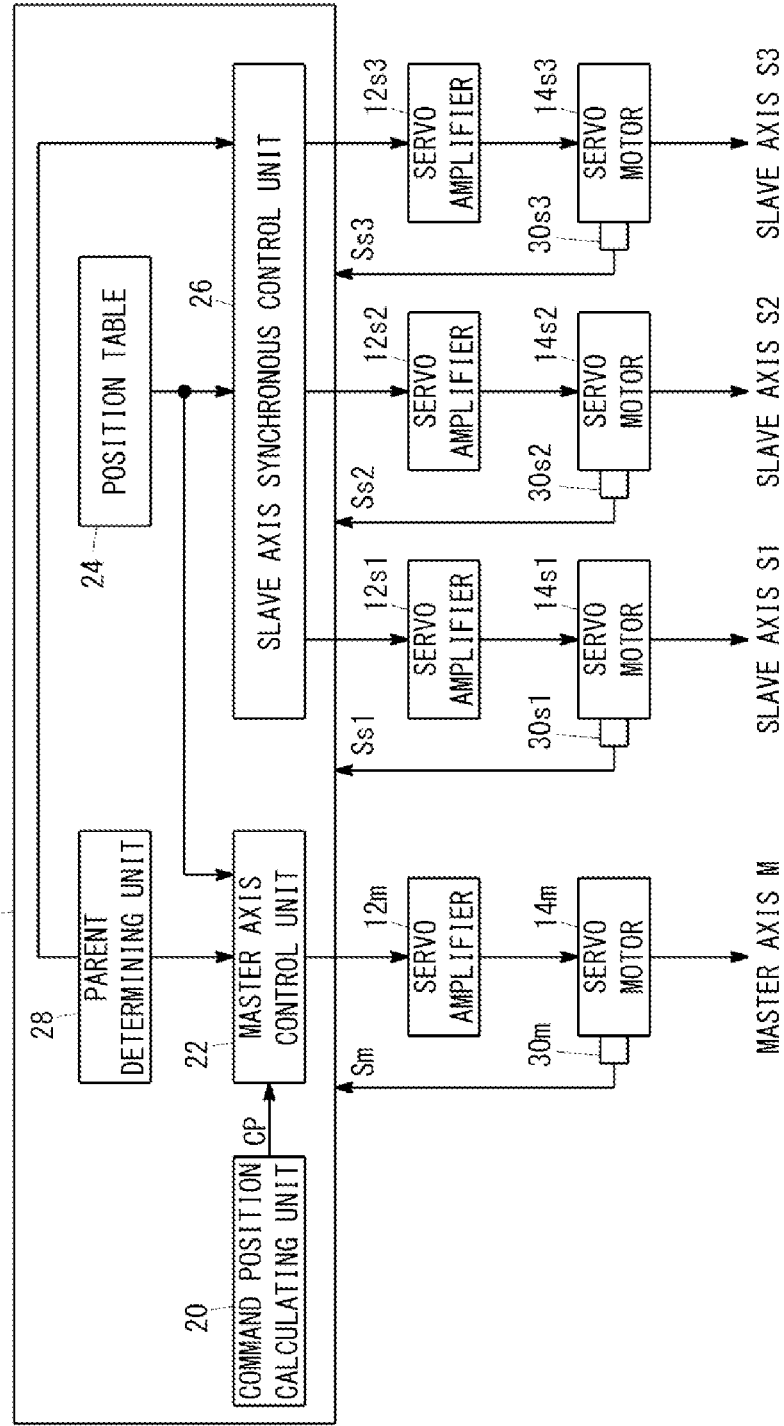
FIG. 1 is a functional block diagram showing the configuration of a numerical controller according to a first embodiment of the present invention.

FIG. 1 is a functional block diagram showing the configuration of a numerical controller 10 according to a first embodiment of the present invention. The numerical controller 10 includes a computer and a storage medium in which a program is stored, and by executing the program, the computer functions as the numerical controller 10 according to the first embodiment. The numerical controller 10 serves to drive and control a plurality of servo motors 14$m$, 14$s$ (14$s$1 to 14$s$3) through a plurality of servo amplifiers 12$m$, 12$s$ (12$s$1 to 12$s$3). The servo motor 14$m$ is a servo motor that drives a master axis M, whereas the servo motors 14$s$ (14$s$1 through 14$s$3) are servo motors that drive slave axes S (S1 through S3). In the first embodiment, the number of slave axes is three, however, the number of slave axes S may be one or two, or may be four or greater. In this case, the same number of servo amplifiers 12$s$ and servo motors 14$s$ as the number of slave axes S may be provided.

In the first embodiment, the position of the master axis M implies the rotational position of the servo motor 14$m$ (for example, the position of an angle of rotation from a reference position of 720 degrees or the like), or the position of a member driven by the servo motor 14$m$. Further, the position of the slave axis S1 implies the rotational position of the servo motor 14$s$1 (for example, the position of an angle of rotation from a reference position of 540 degrees or the like), or the position of a member driven by the servo motor 14$s$1. Similarly, the position of the slave axis S2 implies the rotational position of the servo motor 14$s$2 or the position of a member driven by the servo motor 14$s$2, and the position of the slave axis S3 implies the rotational position of the servo motor 14$s$3 or the position of a member driven by the servo motor 14$s$3. Further, the driven directions of the members driven by the respective servo motors 14$s$ (14$s$1 through 14$s$3) may be the mutually orthogonal X-axis direction, Y-axis direction, and Z-axis direction. Furthermore, the members that are driven by the three servo motors 14$s$1 through 14$s$3 may be the same member. In this case, the same member is moved in the X-axis direction, the Y-axis direction, and the Z-axis direction by the three servo motors 14$s$1 through 14$s$3.

For example, in a box packing system constituted by a conveyor and a box packing machine, which packs objects into boxes conveyed by the conveyor, it is necessary to perform a synchronous control in order to drive arms of the box packing machine in accordance with the positions of boxes conveyed by the conveyor. In this case, an axis that drives the conveyor serves as a master axis M, and a plurality of axes that drive the arms of the box packing machine serve as plural slave axes S. Further, in a press system constituted by a press machine and a transfer device for loading and unloading workpieces into and out of the press machine, it is necessary to perform a synchronous control for driving the transfer device in accordance with operations of the press machine. In this case, an axis that drives the press machine serves as a master axis M, and a plurality of axes that drive the transfer device serve as plural slave axes S.

The numerical controller 10 is equipped with a command position calculating unit 20, a master axis control unit 22, a position table 24, a slave axis synchronous control unit 26, and a parent determining unit 28. By analyzing the machining program, the command position calculating unit 20 calculates command positions CP to command or instruct the positions of the master axis M, and outputs the calculated command positions CP to the master axis control unit 22. The command position calculating unit 20 may also calculate the command positions CP by analyzing operations made by an operator. The machining program is stored in a non-illustrated storage medium of the numerical controller 10. Further, the command position calculating unit 20 may output the calculated command positions CP to the slave axis synchronous control unit 26.

The master axis control unit 22 drives and controls the master axis M based on the command positions CP. More specifically, the master axis control unit 22 drives and controls the master axis M by controlling the servo motor 14$m$ through the servo amplifier 12$m$. A detector 30$m$ such as an encoder or the like is provided in the servo motor 14$m$, and the servo motor 14$m$ is feedback controlled on the basis of position information Sm detected by the detector 30$m$. The position information Sm detected by the detector 30$m$ is output to the numerical controller 10. The position of the master axis M can be specified from the position information Sm.

Information defining a positional relationship between positions (synchronous positions) of the master axis M and positions (synchronous positions) of the three slave axes S1 to S3 is stored in the position table 24. Stated otherwise, in the position table 24, for the purpose of performing a synchronous control of the slave axes S1 to S3 in relation to the master axis M, positions of the three slave axes S1 to S3 are stored in association with a plurality of positions of the master axis M.

FIG. 2 is a diagram showing an example of information that is stored in the position table 24. As shown in FIG. 2, at point 1, the position of the master axis M, and the positions of the slave axes S1 to S3 are all "0.000". Further, at point 2, the position of the master axis M is "10.000", the position of the slave axis S1 is "5.000", the position of the slave axis S2 is "0.000", and the position of the slave axis S3 is "9.000". Further, at point 3, the position of the master axis M is "20.000", the position of the slave axis S1 is "9.000", the position of the slave axis S2 is "6.000", and the position of the slave axis S3 is "12.000". In this manner, the position table 24 defines the correspondence relationship between the positions of the master axis M and the positions of the three slave axes S1 to S3. Further, in the example shown in FIG. 2, information concerning the line segment waveforms between the points also is stored. For example, there is also stored information to the effect of the line segment waveform between points 1 and 2 being of a straight line waveform, and information to the effect of the line segment waveform between points 2 and 3 and the line segment waveform between points 3 and 4 being of a modified sine waveform.

In accordance with the position table 24, the slave axis synchronous control unit 26 drives and controls the three slave axes S1 to S3, so that the positions of the three slave axes S1 to S3 are synchronized with and follow the position of the master axis M. The slave axis synchronous control unit 26 drives and controls the three slave axes S1 to S3 using the position information of the master axis M and the position table 24. The position information of the master axis M may be position information Sm of the servo motor 14m as detected by the detector 30m, may be position information from a non-illustrated detector that directly detects the master axis M, or may be the command positions CP of the master axis M as calculated by the command position calculating unit 20. In short, the position information may be any type of information, as long as the positions of the master axis M can be known therefrom. The current position of the master axis M is understood from the position information Sm of the servo motor 14m detected by the detector 30m, or the position information from the non-illustrated detector that directly detects the master axis M, whereas the positions of the master axis M as it moves from then on are understood from the command positions CP. In any of these cases, by using the position information Sm or the command positions CP, the positions of the slave axes S1 to S3 can be synchronized with and made to follow the position of the master axis M.

More specifically, the slave axis synchronous control unit 26 acquires from the position table 24 respective positions of the slave axes S1 to S3 corresponding to the position information of the master axis M. Then, on the basis of the acquired positions of the respective slave axes S1 to S3, the slave axis synchronous control unit 26 drives and controls the slave axes S1 to S3 by controlling the servo motors 14s1 to 14s3 through the servo amplifiers 12s1 to 12s3. Detectors 30s (30s1 to 30s3) such as encoders or the like are disposed in the servo motors 14s (14s1 to 14s3), and the servo motors 14s (14s1 to 14s3) are feedback controlled on the basis of position information Ss (Ss1 to Ss3) detected by the detectors 30s (30s1 to 30s3). The position information Ss1 to Ss3 detected by the detectors 30s1 to 30s3 is output to the numerical controller 10. The positions of the slave axes S1 to S3 can be specified from the position information Ss1 to Ss3.

As shown in FIG. 2, for example, if the position of the master axis M is "20.000", the slave axis synchronous control unit 26 drives and controls the slave axes S1 to S3, such that the position of the slave axis S1 becomes "9.000", the position of the slave axis S2 becomes "6.000", and the position of the slave axis S3 becomes "12.000". In this manner, the relationship between the master axis M and the slave axes S1 to S3 is a parent and child relationship. In other words, in accordance with the position of the master axis M, which is the parent, the three slave axes S1 to S3, which are children, are driven.

The parent determining unit 28 determines, from among the three slave axes S1 to S3, a slave axis S that serves as a parent (ancestor) of the master axis M. The parent determining unit 28 determines as the parent of the master axis M a slave axis S (also referred to as an uncontrollable slave axis Sf) which is stopped due to a failure. Consequently, the parent determining unit 28 detects an uncontrollable slave axis Sf, and determines the detected uncontrollable slave axis Sf to be the parent of the master axis M. For example, in the case that excitation of the servo motor 14s is shut off due to a factor such as a failure in the servo amplifier 12s, the servo motor 14s for which excitation thereof has been shut off rotates due to inertia and thereafter stops. Therefore, the slave axis S that is driven by the servo motor 14s for which excitation thereof was shut off also moves due to inertia and thereafter stops. Accordingly, in the case that a servo motor 14s is detected for which excitation thereof is shut off, the parent determining unit 28 determines the slave axis S (uncontrollable slave axis Sf) that is driven by that servo motor 14s to be the parent (ancestor) of the master axis M. For example, in the case that excitation of the servo motor 14s1 is shut off due to a factor such as a failure of the servo amplifier 12s1 or the like, the parent determining unit 28 determines the slave axis S1 (uncontrollable slave axis Sf) to be the parent (ancestor) of the master axis M. The parent determining unit 28 outputs to the master axis control unit 22 and the slave axis synchronous control unit 26 information indicative of the slave axis S (uncontrollable slave axis Sf) that is determined to be the parent.

More specifically, using output signals from non-illustrated current sensors, which detect excitation currents output respectively from the servo amplifiers 12s1 to 12s3, the parent determining unit 28 may detect an uncontrollable slave axis Sf, and may determine the detected uncontrollable slave axis Sf to be the parent of the master axis M.

In order to facilitate explanation of the present invention, as an example of a case in which the slave axis S is stopped due to a failure, a case in which excitation has been shut off due to a failure of the servo amplifier 12s has been described as above. However, the present invention is not limited to this example. Stated otherwise, in a case in which a slave axis S is moved by inertia and thereafter stops due to another failure factor as well, the parent determining unit 28 determines the stopped slave axis S (uncontrollable slave axis Sf) to be the parent of the master axis M.

When an uncontrollable slave axis Sf that serves as the parent of the master axis M is determined by the parent determining unit 28, the master axis control unit 22 drives and controls the master axis M in accordance with the position table 24, such that the position of the master axis M is synchronized with and follows the position of the uncontrollable slave axis Sf determined to be the parent. For example, in the case that the uncontrollable slave axis Sf that serves as the parent of the master axis M as determined by the parent determining unit 28 is the slave axis S1, the master axis control unit 22 drives and controls the master axis M in accordance with the position table 24, such that the position of the master axis M is synchronized with and follow the position of the slave axis S1. In other words, when an uncontrollable slave axis Sf that serves as the parent is determined by the parent determining unit 28, the master axis control unit 22 brings to an end the driving and controlling of the master axis M on the basis of the command positions CP calculated by the command position calculating unit 20, and initiates a synchronous control based on the positions of the uncontrollable slave axis Sf. Owing thereto, since the master axis M is driven in synchronism with driving of the uncontrollable slave axis Sf, the master axis M decelerates and thereafter stops together with the uncontrollable slave axis Sf.

Figure 3:
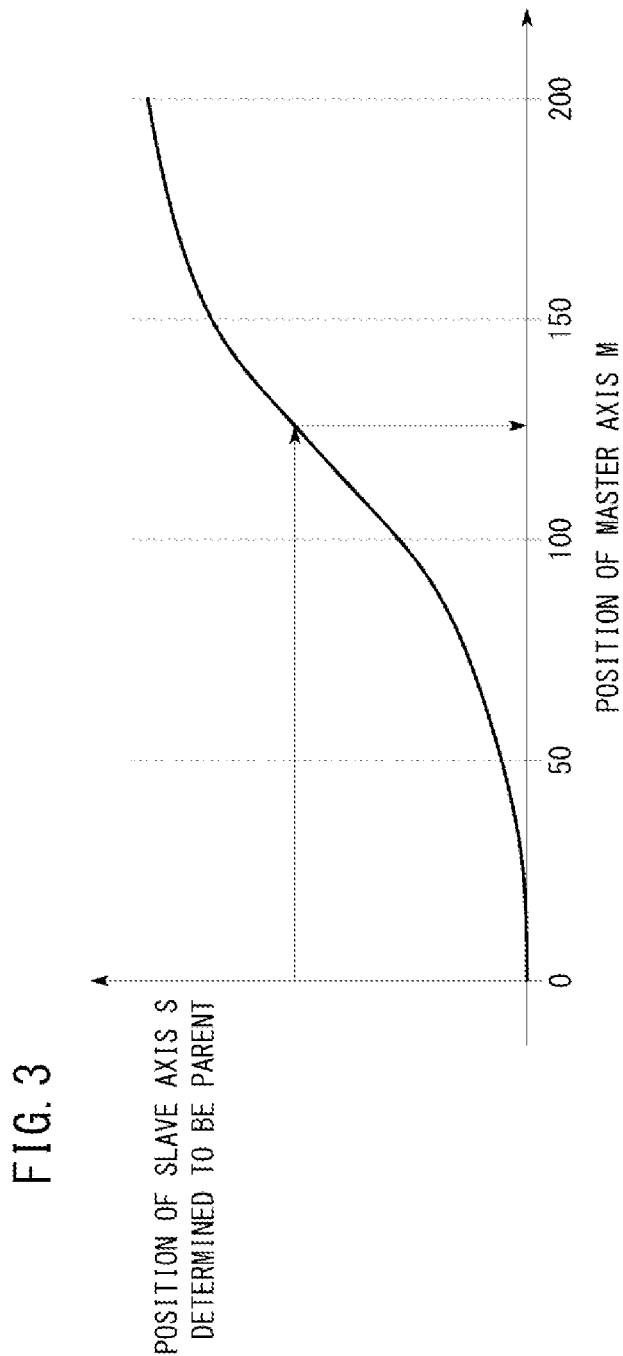
FIG. 3 is a graph showing an example of a relationship between positions of a master axis and positions of a slave axis determined to be a parent of the master axis, which is stored in the position table shown in FIG. 2.

More specifically, the master axis control unit 22 drives and controls the master axis M using the position table 24 and the position information of the uncontrollable slave axis Sf that serves as the parent of the master axis M as determined by the parent determining unit 28. FIG. 3 is a graph showing an example of a relationship between positions of the master axis M and positions of the slave axis S (hereinafter referred to as an uncontrollable slave axis Sf) determined to be the parent of the master axis M, which is stored in the position table 24 shown in FIG. 2. In this manner, using the position table 24, positions (synchronous positions) of the master axis M can be determined that correspond with the positions of the uncontrollable slave axis Sf. The position information of the uncontrollable slave axis Sf may be the position information Ss of the detector 30*s*, which is provided in the servo motor 14*s* that drives the uncontrollable slave axis Sf. Stated otherwise, in the case that the uncontrollable slave axis Sf is the slave axis S1, the positions of the uncontrollable slave axis Sf (slave axis S1) can be determined based on the position information Ss1 detected by the detector 30*s*1. The position information Ss is not necessarily required, so long as there is information enabling the position information of the uncontrollable slave axis Sf to be known.

Figure 4:
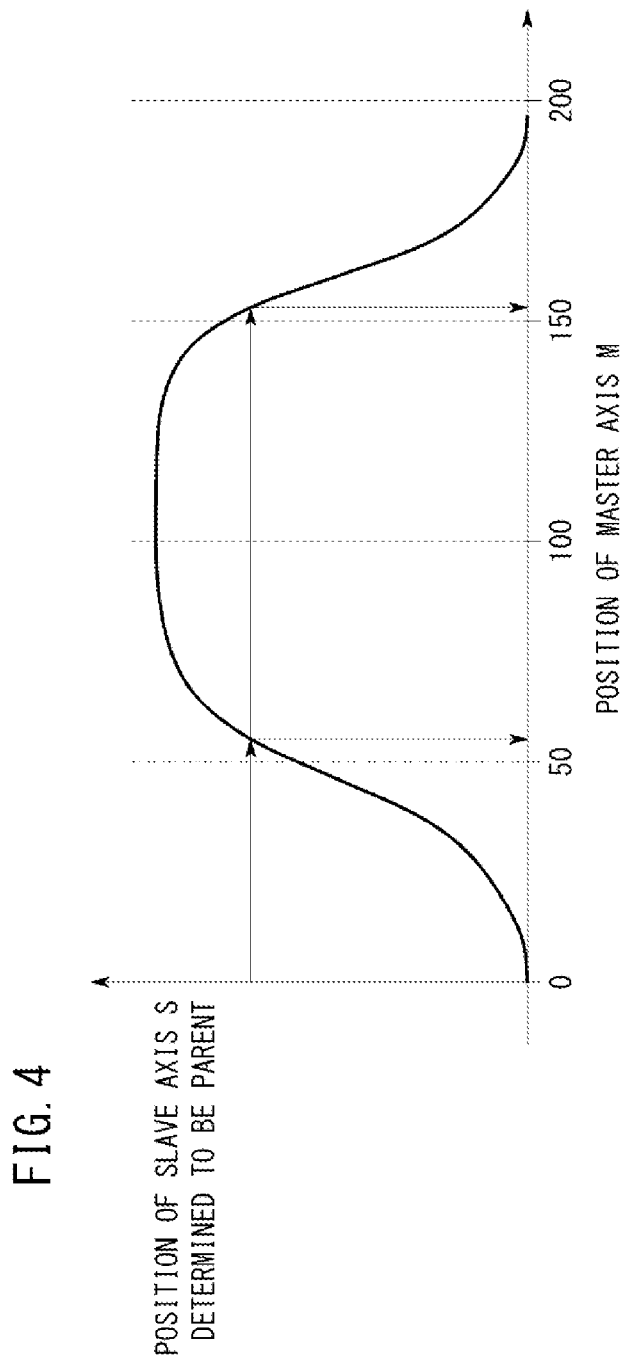
FIG. 4 is a graph showing an example (another example) of a relationship between positions of a master axis and positions of a slave axis determined to be a parent of the master axis, which is stored in the position table shown in FIG. 2.

Moreover, as shown in FIG. 4, if there are a plurality of positions of the master axis M in the position table 24 that correspond with a position of the slave axis S (uncontrollable slave axis Sf) determined to be the parent of the master axis M, the position (synchronous position) that is closer to the current position of the master axis M may be determined to be the position of the master axis M.

When an uncontrollable slave axis Sf that serves as the parent of the master axis M is determined by the parent determining unit 28, the slave axis synchronous control unit 26 drives and controls the slave axes S other than the uncontrollable slave axis Sf, such that the positions of the slave axes S other than the uncontrollable slave axis Sf are synchronized with and follow the position of the master axis M. Consequently, relationships are defined in which the uncontrollable slave axis Sf becomes the parent (ancestor), the master axis M becomes the child of the uncontrollable slave axis Sf, and the other slave axes S (i.e., the slave axes S other than the uncontrollable slave axis Sf) become children of the master axis M. For example, in the case that the slave axis S1 is determined to be the uncontrollable slave axis Sf, the slave axis synchronous control unit 26 drives and controls the slave axes S2, S3, so that the positions of the slave axes S2, S3 are synchronized with and follow the position of the master axis M. In this case, relationships are defined in which the slave axis S1, i.e., the uncontrollable slave axis Sf, becomes the parent (ancestor), the master axis M becomes the child of the slave axis S1, and the slave axes S2, S3 become the children of the master axis M (i.e., the grandchildren of the slave axis S1). As a result, since the master axis M is driven in synchronism with the uncontrollable slave axis Sf, and the slave axes S other than the uncontrollable slave axis Sf are driven in synchronism with the master axis M, the master axis M and the slave axes S other than the uncontrollable slave axis Sf are decelerated and stopped together with the uncontrollable slave axis Sf, in a state in which the synchronous positional relationship is maintained.

In the first embodiment, in order to facilitate understanding of the description, a case has been explained in which the slave axis S, which is stopped naturally due to a failure, is determined to be the parent of the master axis M. However, the axis that serves as the parent of the master axis M is not limited to being a slave axis S which is stopped due to a factor such as a failure or the like. Accordingly, the parent determining unit 28 may determine an arbitrary slave axis S to be the slave axis S that serves as the parent of the master axis M. In this case, since the slave axis S serving as the parent of the master axis M is not necessarily an uncontrollable axis, the slave axis S serving as the parent of the master axis M may be stopped or driven. In that case, depending on the movement of the slave axis S serving as the parent of the master axis M, the master axis M and the slave axes S other than the slave axis S serving as the parent of the master axis M are driven in synchronism therewith.

In the foregoing manner, the numerical controller 10 according to the first embodiment comprises the master axis control unit 22 that drives and controls the master axis M based on a command position CP, the position table 24 in which a positional relationship is defined between positions of a master axis M and positions of a plurality of slave axes S, the slave axis synchronous control unit 26 that drives and controls the plurality of slave axes S in accordance with the position table 24, so that the positions of the plural slave axes S are synchronized with and follow the position of the master axis M, and the parent determining unit 28 that determines, from among the plurality of slave axes S, an arbitrary one of the slave axes S to be a parent of the master axis M. In addition, in the case that the slave axis S that serves as the parent of the master axis M is determined by the parent determining unit 28, the master axis control unit 22 drives and controls the master axis M in accordance with the position table 24, so that the position of the master axis M is synchronized with and follows the position of the slave axis S determined to be the parent.

According to this feature, even if the slave axis S serving as the parent of the master axis M is driven or stopped by a command, and not by a synchronous control corresponding to the master axis M, the synchronous state of all of the axes (the master axis M and the plurality of slave axes S) can be maintained. Consequently, interference between the master axis M and the plurality of slave axes S, or interference with other members or devices can be prevented. For example, in the case that one member is driven by all of the slave axes S, even if there is an obstacle in the path of one of the slave axes S and the slave axis S is stopped immediately, even if the slave axis S is made to perform an operation that is not synchronized with the master axis M, or even if the slave axis S stops due to a failure, the member can be operated with a correct movement path. Conversely, in the case that one member is driven by all of the slave axes S, when all of the slave axes S are in an asynchronous state, the member cannot be operated with the correct movement path and passes through an unexpected path. As a result, the member may collide with other machines or members. However, according to the first embodiment, such a problem does not occur.

In the case that a slave axis S that serves as the parent of the master axis M is determined by the parent determining unit 28, the slave axis synchronous control unit 26 drives and controls the slave axes S other than the slave axis S determined to be the parent, so that the positions of the slave axes S other than the slave axis S determined to be the parent are synchronized with and follow the position of the master axis M. In accordance with this feature, even if the slave axis S determined to be the parent of the master axis M is stopped or moved intentionally, as well as in the case of stoppage due to a failure, the parent/child relationship between the master axis M and the slave axes S other than the slave axis S determined to be the parent of the master axis M can be maintained as is. Accordingly, the synchronous state of all of the axes (the master axis M and the plurality of slave axes S) can be maintained.

The slave axis synchronous control unit 26 acquires position information of the master axis M, and using the position information of the master axis M and the position table 24, drives and controls the slave axis S, so that the positions of the slave axis S are synchronized with and follow the positions of the master axis M. In accordance therewith, the synchronous control of the slave axis S in relation to the master axis M can be performed appropriately, and interference between the master axis M and the slave axis S can be prevented.

The master axis control unit 22 acquires position information of the slave axis S determined to be the parent, and using the acquired position information of the slave axis S and the position table 24, drives and controls the master axis M, so that the position of the master axis M is synchronized with and follows the position of the slave axis S determined to be the parent. In accordance therewith, the synchronous control of the master axis M in relation to the slave axis S determined to be the parent of the master axis M can be performed appropriately, and interference between the master axis M and the slave axis S can be prevented.

In the event that the slave axis S that serves as the parent of the master axis M is determined by the parent determining unit 28, and in the case that, in the position table 24, there are a plurality of synchronous positions of the master axis M corresponding to the position of the slave axis S determined to be the parent, the master axis control unit 22 determines the synchronous position closer to a current position of the master axis M to be the position of the master axis M. In accordance therewith, the synchronous control of the master axis M in relation to the slave axis S determined to be the parent of the master axis M can be performed appropriately, and interference between the master axis M and the slave axis S can be prevented.

Second Embodiment

Figure 5:
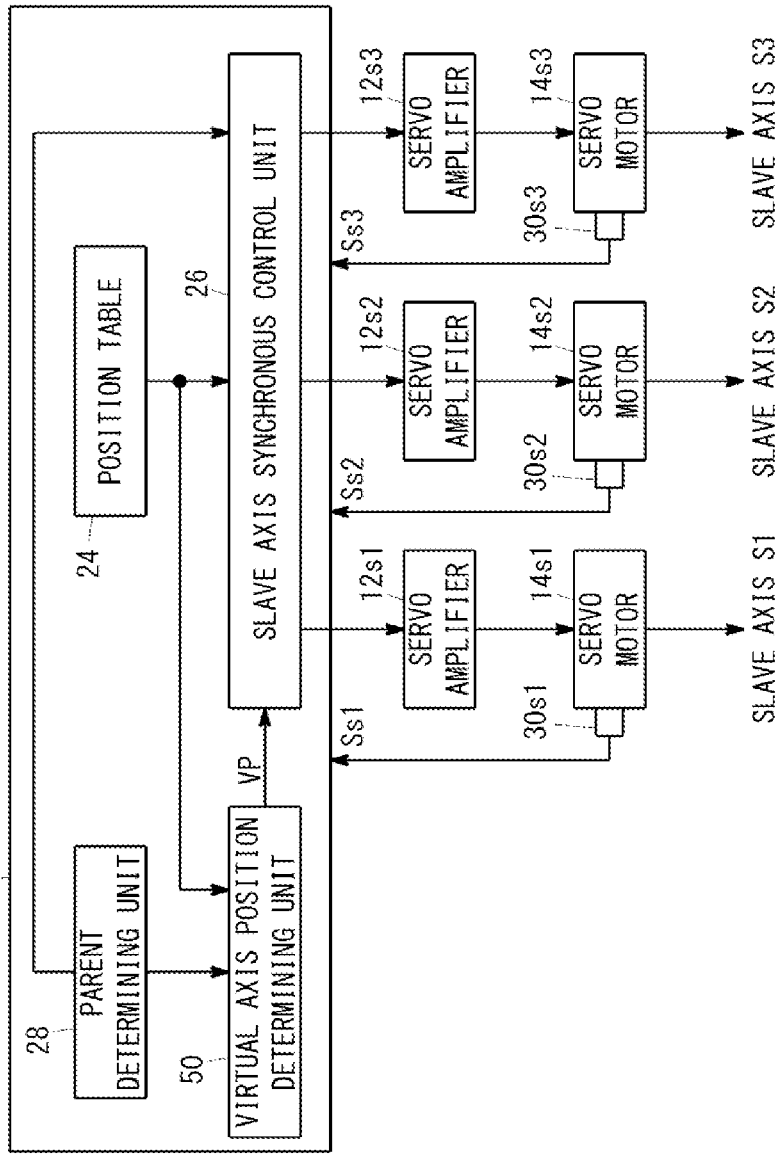
FIG. 5 is a functional block diagram showing the configuration of a numerical controller according to a second embodiment of the present invention.

FIG. 5 is a functional block diagram showing the configuration of a numerical controller 10a according to a second embodiment of the present invention. Constituent elements which are the same as the above-described constituent elements of the first embodiment are denoted by the same reference characters, and only those portions that differ from the first embodiment will be described. The numerical controller 10a is equipped with a position table 24, a slave axis synchronous control unit 26, a parent determining unit 28, and a virtual axis position determining unit 50. The master axis M is driven and controlled by a numerical controller that differs from the numerical controller 10a.

In accordance with the position table 24, the slave axis synchronous control unit 26 drives and controls the three slave axes S1 to S3, so that the positions of the three slave axes S1 to S3 are synchronized with and follow the position of the master axis M. The slave axis synchronous control unit 26 drives and controls the three slave axes S1 to S3 using the position information of the master axis M and the position table 24. The position information of the master axis M may be the position information Sm detected by the detector 30m provided in the servo motor 14m that drives the master axis M described in the above-described first embodiment, may be position information from a non-illustrated detector that directly detects the master axis M, or may be the command positions CP of the master axis M as calculated by the command position calculating unit 20 in order to drive and control the master axis M described in the aforementioned first embodiment.

The parent determining unit 28 determines, from among the three slave axes S1 to S3, a slave axis S that serves as a parent (ancestor) of the master axis M. The parent determining unit 28 determines as the parent of the master axis M a slave axis S (uncontrollable slave axis Sf) which is stopped due to a failure. Consequently, the parent determining unit 28 detects an uncontrollable slave axis Sf, and determines the detected uncontrollable slave axis Sf to be the parent of the master axis M. The parent determining unit 28 outputs to the slave axis synchronous control unit 26 and the virtual axis position determining unit 50 information indicative of the slave axis S (uncontrollable slave axis Sf) that is determined to be the parent.

When the slave axis S (uncontrollable slave axis Sf) that serves as the parent (ancestor) of the master axis M is determined by the parent determining unit 28, the virtual axis position determining unit 50 virtually constructs the master axis M. Upon construction of the virtual axis, the position of the virtual axis is the position of the master axis M at that point in time. Additionally, in accordance with the position table 24, the virtual axis position determining unit 50 determines the positions VP of the virtual axis such that the constructed virtual axis of the master axis M is synchronized with and follows the position of the slave axis S (uncontrollable slave axis Sf) determined to be the parent. At this time, in the case that a plurality of positions of the master axis M corresponding to a position of the uncontrollable slave axis Sf are stored in the position table 24, the position (synchronous position) that is closest to the current position VP of the virtual axis is set as the position VP of the virtual axis. The virtual axis position determining unit 50 outputs the determined positions VP of the virtual axis to the slave axis synchronous control unit 26.

When an uncontrollable slave axis Sf that serves as the parent of the master axis M is determined by the parent determining unit 28, the slave axis synchronous control unit 26 drives and controls the slave axes S other than the uncontrollable slave axis Sf, so that the positions of the slave axes S other than the uncontrollable slave axis Sf are synchronized with and follow the position VP of the virtual axis. In other words, when an uncontrollable slave axis Sf that serves as the parent is determined by the parent determining unit 28, the slave axis synchronous control unit 26 brings to an end the synchronous control based on the positions of the master axis M, and initiates a synchronous control based on the positions VP of the virtual axis. Consequently, relationships are defined in which the uncontrollable slave axis Sf becomes the parent (ancestor), the virtual axis becomes the child of the uncontrollable slave axis Sf, and the other slave axes S become children of the virtual axis. As a result, since the positions VP of the virtual axis fluctuate in synchronism with the uncontrollable slave axis Sf, and the slave axes S other than the uncontrollable slave axis Sf are driven in synchronism with the positions VP of the virtual axis, the slave axes S other than the uncontrollable slave axis Sf are decelerated and stopped together with the uncontrollable slave axis Sf. For example, in the case that the slave axis S1 is determined to be the uncontrollable slave axis Sf, the slave axis synchronous control unit 26 drives and controls the slave axes S2, S3, so that the positions of the slave axes S2, S3 are synchronized with and follow the position VP of the virtual axis. Accordingly, the slave axes S2, S3 are decelerated and stopped together with the slave axis S1, which is the uncontrollable slave axis Sf, in a state in which the synchronous positional relationship is maintained.

In the second embodiment, when the parent determining unit 28 detects the slave axis S (uncontrollable slave axis Sf) which is stopped due to a failure, the parent determining unit 28 outputs information to that effect (i.e., failure information of the slave axis S) to the numerical controller that drives and controls the master axis M. When the numerical controller that drives and controls the master axis M receives failure information of the slave axis S, it retracts the master axis M to a retracted position. The retracted position is a position at which the master axis M does not interfere with the slave axes S1 to S3, regardless of how the slave axes S1 to S3 are driven. For example, in the case that the master axis M is an axis for driving a press machine, the master axis M may be driven to such a position that the position of the press machine becomes a top dead center point.

Further, in the second embodiment, although the master axis M is driven and controlled by a numerical controller other than the numerical controller 10a, the numerical controller 10a may also drive and control the master axis M. In this case, the numerical controller 10a is equipped with the master axis control unit 22 shown in FIG. 1, however, when failure of a slave axis S is detected by the parent determining unit 28, the master axis control unit 22 may drive the master axis M to the retracted position.

In this manner, the numerical controller 10a according to the second embodiment is equipped with the position table 24 in which a positional relationship is defined in advance between positions of the master axis M and positions of the plurality of slave axes S, the slave axis synchronous control unit 26 that drives and controls the plurality of slave axes S in accordance with the position table 24, so that the positions of the plurality of slave axes S are synchronized with and track the positions of the master axis M, the parent determining unit 28 which determines, from among the plurality of slave axes S, one slave axis S (uncontrollable slave axis Sf), which is stopped due to a failure, to be a parent of the master axis M, and the virtual axis position determining unit 50 that determines positions VP of a virtual axis in accordance with the position table 24, so that the virtual axis, in which the master axis M is constructed virtually, is synchronized with and follows the position of the slave axis S (uncontrollable slave axis Sf) determined to be the parent. Upon construction of the virtual axis, the position of the virtual axis is the position of the master axis M at that point in time. In addition, in the case that a slave axis S (uncontrollable slave axis Sf) that serves as the parent of the master axis M is determined by the parent determining unit 28, in accordance with the position table 24, the slave axis synchronous control unit 26 drives and controls the slave axes S other than the slave axis S (uncontrollable slave axis Sf) determined to be the parent, so that the positions of the slave axes S other than the slave axis S (uncontrollable slave axis Sf) determined to be the parent are synchronized with and follow the position VP of the virtual axis.

In accordance therewith, in the event that the master axis M is driven and controlled by a different numerical controller, and even in the case that the uncontrollable slave axis Sf is stopped due to a failure, the synchronous state of all of the slave axes S can be maintained. Stated otherwise, in the case that the master axis M is driven and controlled by the other numerical controller, the uncontrollable slave axis Sf cannot be the parent of the master axis M, and the synchronous state between all of the slave axes S collapses. However, by constructing the virtual axis of the master axis M, it is possible to maintain the synchronized state of all of the slave axes S. Consequently, in the case that one member is driven by all of the slave axes S, even if one uncontrollable slave axis Sf stops due to a failure, the member can be operated with a correct movement path. Conversely, in the case that one member is driven by all of the slave axes S, when all of the slave axes S are in an asynchronous state, the member cannot be operated with the correct movement path and passes through an unexpected path. As a result, the member may collide with other machines or members. However, according to the second embodiment, such a problem does not occur.

In the event that the slave axis S that serves as the parent of the master axis M is determined by the parent determining unit 28, and in the case that, in the position table 24, there are a plurality of synchronous positions of the master axis M corresponding to the position of the slave axis S determined to be the parent, the virtual axis position determining unit 50 determines the synchronous position closer to a current position VP of the virtual axis to be the position VP of the virtual axis. In accordance with this feature, the synchronous control of the positions VP of the virtual axis in relation to the uncontrollable slave axis Sf can be performed appropriately, and the synchronous state of all of the slave axes S can be maintained.

In the second embodiment as well, a case has been explained in which the slave axis S, which is stopped naturally due to a failure, is determined to be the parent of the master axis M. However, the slave axis S that serves as the parent of the master axis M is not limited to being a slave axis S which is stopped due to a factor such as a failure or the like. Accordingly, the parent determining unit 28 may determine an arbitrary slave axis S to be the slave axis S that serves as the parent of the master axis M (virtual axis). In this case, since the slave axis S serving as the parent of the master axis M is not necessarily an uncontrollable axis, the slave axis S serving as the parent of the master axis M may be stopped or driven. In that case, depending on the movement of the slave axis S serving as the parent of the master axis M, the master axis M (virtual axis) and the slave axes S other than the slave axis S serving as the parent of the master axis M (virtual axis) are driven in synchronism therewith.

Further, in each of the above-described embodiments, although the parent determining unit 28 detects a slave axis S (an uncontrollable slave axis Sf) that is stopped due to a failure, a machine provided with the three slave axes S1 to S3 may detect the uncontrollable slave axis Sf. In this case, information (alarm information) indicating the uncontrollable slave axis Sf, which is detected by the machine provided with the three slave axes S1 to S3, is transmitted to the parent determining unit 28, and based on the alarm information, the parent determining unit 28 determines the uncontrollable slave axis Sf to be the parent of the master axis M. Further, in the case that the parent of the master axis M is set to an arbitrary slave axis S, such a determination is made by notifying the parent determining unit 28 concerning the slave axis S that is desired to be set as the parent of the master axis M.

While the invention has been particularly shown and described with reference to preferred embodiments, it will be understood that variations and modifications can be effected thereto by those skilled in the art without departing from the scope of the invention as defined by the appended claims.

What is claimed is:

1. A numerical controller comprising:
    a position table in which a positional relationship is defined between a position of a master axis and a position of a slave axis;
    a slave axis synchronous control unit configured to drive and control the slave axis in accordance with the position table so that the position of the slave axis is synchronized with and follows the position of the master axis;
    a parent determining unit configured to determine the slave axis to be a parent of the master axis; and
    a master axis control unit configured to drive and control the master axis based on a command position, and in an event that the slave axis which serves as the parent of the master axis is determined by the parent determining unit, drive and control the master axis in accordance with the position table, so that the position of the master axis is synchronized with and follows the position of the slave axis determined to be the parent.

2. The numerical controller according to claim 1, wherein, in a case that the slave axis is stopped due to a failure, the parent determining unit determines the stopped slave axis to be the parent of the master axis.

3. The numerical controller according to claim 1, wherein, in a case that a plurality of the slave axes are synchronized with the master axis, and in an event that the slave axis that serves as the parent of the master axis is determined by the parent determining unit, the slave axis synchronous control unit drives and controls a slave axis other than the slave axis determined to be the parent, so that the position of the slave axis other than the slave axis determined to be the parent is synchronized with and follows the position of the master axis.

4. The numerical controller according to claim 1, wherein the slave axis synchronous control unit acquires position information of the master axis, and using the position information of the master axis and the position table, drives and controls the slave axis, so that the position of the slave axis is synchronized with and follows the position of the master axis.

5. The numerical controller according to claim 1, wherein the master axis control unit acquires position information of the slave axis determined to be the parent, and using the acquired position information of the slave axis and the position table, drives and controls the master axis, so that the position of the master axis is synchronized with and follows the position of the slave axis determined to be the parent.

6. The numerical controller according to claim 1, wherein, in an event that the slave axis that serves as the parent of the master axis is determined by the parent determining unit, and in a case that, in the position table, there are a plurality of synchronous positions of the master axis corresponding to the position of the slave axis determined to be the parent, the master axis control unit determines one of the synchronous positions closer to a current position of the master axis to be the position of the master axis.

7. A numerical controller comprising:
a position table in which a positional relationship is defined in advance between a position of a master axis and positions of a plurality of slave axes;
a slave axis synchronous control unit configured to drive and control the plurality of slave axes in accordance with the position table, so that the positions of the plurality of slave axes are synchronized with and follow the position of the master axis;
a parent determining unit configured to determine one slave axis, from among the plurality of slave axes, to be a parent of the master axis; and
a virtual axis position determining unit configured to determine a position of a virtual axis, in which the master axis is constructed virtually, in accordance with the position table, so that the virtual axis is synchronized with and follows the position of the slave axis determined to be the parent;
wherein the slave axis synchronous control unit, in an event that the slave axis that serves as the parent of the master axis is determined by the parent determining unit, drives and controls a slave axis other than the slave axis determined to be the parent in accordance with the position table, so that the position of the slave axis other than the slave axis determined to be the parent is synchronized with and follows the position of the virtual axis.

8. The numerical controller according to claim 7, wherein the parent determining unit determines one of the slave axes which is stopped due to a failure to be the parent of the master axis.

9. The numerical controller according to claim 7, wherein, in an event that the slave axis that serves as the parent of the master axis is determined by the parent determining unit, and in a case that, in the position table, there are a plurality of synchronous positions of the master axis corresponding to the position of the slave axis determined to be the parent, the virtual axis position determining unit determines one of the synchronous positions closer to a current position of the virtual axis to be the position of the virtual axis.

10. A synchronous follow-up control method in which a position of a slave axis is synchronized with and made to follow a position of a master axis, comprising:
a master axis driving and controlling step of driving and controlling the master axis based on a command position;
a slave axis synchronous controlling step of driving and controlling the slave axis in accordance with a position table in which a positional relationship is defined in advance between the position of the master axis and the position of the slave axis, so that the position of the slave axis is synchronized with and follows the position of the master axis;
a parent determining step of determining the slave axis to be a parent of the master axis; and
a master axis synchronous controlling step of, in an event that the slave axis which serves as the parent of the master axis is determined by the parent determining step, driving and controlling the master axis in accordance with the position table, so that the position of the master axis is synchronized with and follows the position of the slave axis determined to be the parent.

11. The synchronous follow-up control method according to claim 10, wherein, in the parent determining step, in a case that the slave axis is stopped due to a failure, the stopped slave axis is determined to be the parent of the master axis.

12. The synchronous follow-up control method according to claim 10, wherein, in the slave axis synchronous controlling step, in a case that a plurality of the slave axes are synchronized with the master axis, and in an event that the slave axis that serves as the parent of the master axis is determined by the parent determining step, a slave axis other than the slave axis determined to be the parent is driven and controlled, so that the position of the slave axis other than the slave axis determined to be the parent is synchronized with and follows the position of the master axis.

13. The synchronous follow-up control method according to claim 10, wherein, in the master axis synchronous controlling step, in a case that the slave axis that serves as the parent of the master axis is determined by the parent determining step, and in an event that, in the position table, there are a plurality of synchronous positions of the master axis corresponding to the position of the slave axis determined to be the parent, one of the synchronous positions closer to a current position of the master axis is determined to be the position of the master axis.

14. A synchronous follow-up control method in which positions of a plurality of slave axes are synchronized with and made to follow a position of a master axis, comprising:

a slave axis synchronous controlling step of driving and controlling the plurality of slave axes in accordance with a position table in which a positional relationship is defined in advance between the position of the master axis and the positions of the plurality of slave axes, so that the positions of the plurality of slave axes are synchronized with and follow the position of the master axis;

a parent determining step of determining one slave axis, from among the plurality of slave axes, to be a parent of the master axis; and a virtual axis position determining step of determining a position of a virtual axis, in which the master axis is constructed virtually, in accordance with the position table, so that the virtual axis is synchronized with and follows the position of the slave axis determined to be the parent;

wherein, in the slave axis synchronous controlling step, in an event that the slave axis that serves as the parent of the master axis is determined by the parent determining step, a slave axis other than the slave axis determined to be the parent is driven and controlled, so that the position of the slave axis other than the slave axis determined to be the parent is synchronized with and follows the position of the virtual axis.

15. The synchronous follow-up control method according to claim 14, wherein, in the virtual axis position determining step, in a case that the slave axis that serves as the parent of the master axis is determined by the parent determining step, and in an event that, in the position table, there are a plurality of synchronous positions of the master axis corresponding to the position of the slave axis determined to be the parent, one of the synchronous positions closer to a current position of the virtual axis is determined to be the position of the virtual axis.

* * * * *